MULTIVALLEY SEMICONDUCTOR AMPLIFIER FOR HYPERSONIC WAVES

Filed Feb. 1, 1965

INVENTOR.
MELVIN POMERANTZ

BY George Baron

ATTORNEY

United States Patent Office 3,312,906

Patented Apr. 4, 1967

3,312,906

MULTIVALLEY SEMICONDUCTOR AMPLIFIER FOR HYPERSONIC WAVES

Melvin Pomerantz, Ossining, N.Y., assignor to International Business Machines Corporation, New York, N.Y., a corporation of New York Filed Feb. 1, 1965, Ser. No. 429,291
4 Claims. (Cl. 330—5)

This invention relates to acoustic wave amplification and more particularly to the type of amplification based on travelling wave interaction with electrons.

In prior art teachings of acoustic amplifiers employing the principles of travelling wave interaction with electrons, materials such as bismuth, or piezoelectric crystals, such as cadmium sulfide, were employed. In such systems which employed cadmium sulfide, the maximum frequencies amplified were of the order of or less than 1 kmc./s. and a source of light was needed to create electrons within the crystal medium. Such electrons would interact with the acoustic wave that was transmitted through the cadmium sulfide.

For travelling wave acoustic amplifiers at high microwave frequencies of $10^{10}$ c.p.s. or greater, it is desirable to employ crystals that have a very high crystalline perfection. Cadmium sulfide crystals with high crystalline perfection are not readily available. Bismuth also is difficult to obtain with high crystalline perfection and is also too soft to be easily polished to optical tolerances. Highly polished surfaces prepared to very close tolerances are generally needed for introducing very short wave length acoustic waves into the crystal. Moreover the bismuth acoustic amplifier requires the simultaneous application of a high magnetic field as well as an electric field. It would be desirable when making acoustic amplifiers to eliminate the need for a large magnetic field.

The present invention attains a hypersonic amplifier which employs crystalline media capable of readily being prepared so as to have crystalline perfection, can be polished to high tolerances and requires modest electric fields during the operation of the acoustic amplifier. The crystalline media employed in the present invention are semiconductors such as germanium and silicon. Such semiconductors can be grown to crystalline perfection, can be highly polished to optical tolerances with well known techniques. The mobilities of electrons in germanium and silicon are high at low temperatures, so that electric fields only of the order of 10 volts per centimeter to 100 volts per centimeter are needed to give the electrons within the crystal velocities greater than or equal to the velocity of sound in the crystal. These crystals also have the property that electrons can be liberated from donors within these crystals by the application of electric fields only. Thus it is possible to obtain carriers within the crystal at low temperatures with the same electric field that gives such carriers a drift velocity. As will be described hereinafter, germanium and silicon permit amplification without any overall space charge. This absence of overall space charge in germanium and silicon results from the multi-valley nature of their respective electronic band structures so that no special means, such as magnetic fields, are required to minimize coulomb repulsion.

Consequently, it is an object of this invention to provide a novel acoustic amplifier.

It is yet another object to provide an acoustic amplifier capable of amplifying frequencies of the order of $10^{10}$ cycles per second.

It is yet another object to obtain a hypersonic amplifier having an amplification much higher than was obtainable in the prior art.

It is yet another object to obtain an acoustic amplifier employing specific types of semiconductors selected to improve the characteristics of hypersonic amplifiers.

The foregoing and other objects, features and advantages of the invention will be apparent from the following more particular description of a preferred embodiment of the invention as illustrated in the accompanying drawing.

Figures 1, 2:
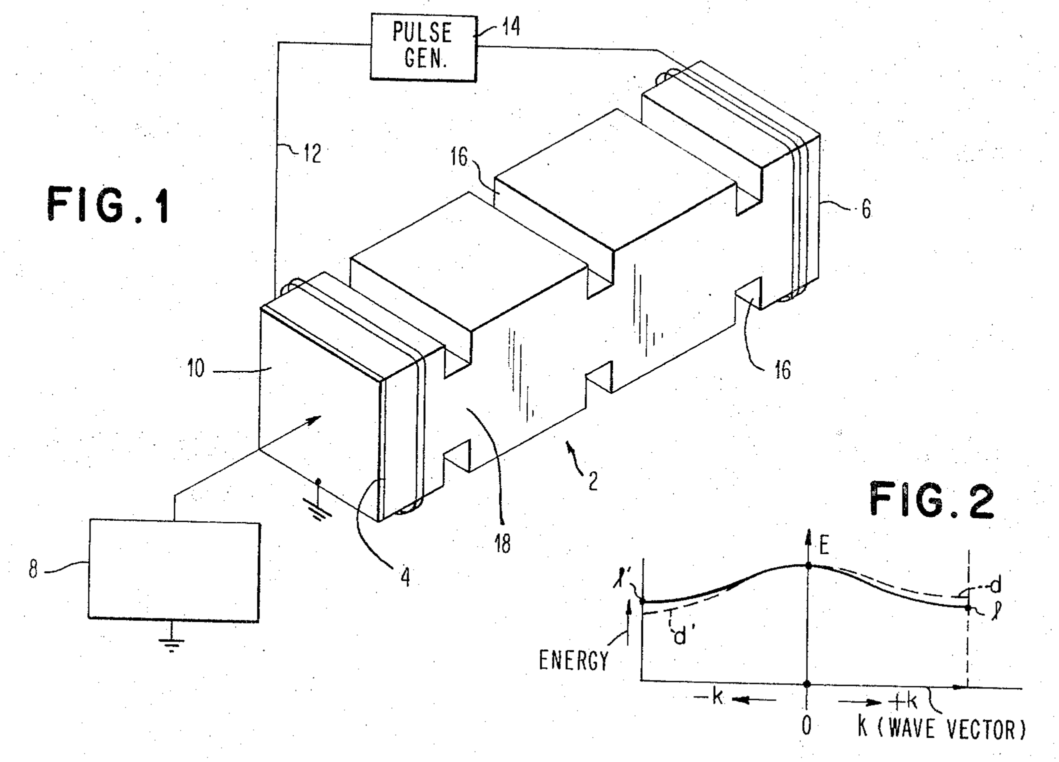
FIGURE 1 is a schematic representation of a preferred embodiment of the invention.
FIGURE 2 is an energy versus wave vector curve for depicting the energy of an electron versus its momentum in a crystal.

FIGURE 1 shows an n-type germanium crystal 2 whose end surfaces 4 and 6 are polished to extremely fine optical tolerances so that such surfaces are very smooth and substantially parallel. The smoothness is desirable, or necessary in some cases, to prevent scattering of sound waves impinging upon them, or to diminish the diffusion of such sound waves through the crystal 2. A source of high frequency electrical energy 8, such as a magnetron or the like, supplies electrical energy at a frequency of the order of $10^{10}$ cycles per second. A ferromagnetic film 10, about 3000 A. thick, serves as a transducing element and is evaporated onto one face 4 of crystal 2. The transducer 10 can be composed of a substance that is piezoelectric, magneto-strictive, or of any substance that converts electrical energy into hypersonic energy. On occasion, the crystal 2 itself may serve as a transducing medium and convert high frequency electrical signals impinging on one of its surfaces 4 or 6 into hypersonic energy.

At each end of the crystal 2 are located wrapped portions of winding 12 through which a pulse generator 14 will send pulses of duration of the order of microseconds to provide the electric field that will accelerate electrons through the crystal medium 2.

The crystal 2 is immersed in liquid helium, not shown, and, when germanium is the semiconductor employed as the amplifying crystal, is maintained at a temperature less than 10° K. to avoid thermal losses and to freeze electrons onto the impurities in the germanium to avoid electron losses. Slots 16 are cut into crystal 2 to aid in confining sound waves through a narrow portion 18 of the crystal and also to improve the cooling of such crystal 2 when the latter is heated by the electric current pulses applied to it.

In obtaining hypersonic amplification, the sound wave entering the semiconductor crystal can be amplified only along certain axes of the semiconductor. For purposes of explaining the operation of the novel hypersonic amplifier, the semiconductor germanium has been selected for crystal 2, although other semiconductors can be employed, as will be explained hereinafter. FIGURE 2 is a schematic diagram of the energy E of a charge carrier (such as an electron) as a function of the wave vector $k$ of such particle, $k$ being related to the velocity of said particle. For the semiconductor germanium, the lowest energy of an electron exists when its wave vector $k$ is in the (111) direction. The lowest energy shown at $l$ is called a valley. A symmetrical valley $l'$ is also shown. Thus germanium would be considered a multi-valleyed crystal.

In general, multi-valleyed crystals are those crystals which (1) have an energy minimum at a position other than at $k=0$ and (2) have a plurality of such valleys because of the symmetry of the crystal. Energies of different valleys in a crystal are equal ("degenerate"). When a sound wave of a particular polarization, to be described hereinafter, enters crystal 2 by way of transducer 10, such sound wave lifts or removes the degeneracy of valleys such as $l$ and $l'$ (such lifting is represented in FIGURE 2 as dotted lines $d$ and $d'$,) permitting a large amplification of the sound wave as it traverses the crystal 2. When the sound wave emanating from the transducer 10 removes the degeneracy of the conduction band minima, two or more potential waves accompany the sound or strain wave. Electron drift is initiated by a pulse, of the order of microseconds, emanating from pulse generator 14. The free electrons in the germanium crystal 2 bunch in the minima of each of the potential waves separately, but the sum of the charges in the several potential waves is approximately uniform in space. Hence there is no space charge repulsion due to the bunching of electrons, as would be the case in a single valley semiconductor or in a piezoelectric semiconductor. Thus, when germanium is used, no additional means, such as a magnetic field, is needed to minimize coulomb repulsion, the latter diminishing amplification of the travelling wave.

In summary, if an acoustic signal enters crystal 2 and an electron current is produced in the direction of wave propagation of such signal so that the electronic velocity exceeds the velocity of such acoustic wave, a travelling wave interaction between the electron current and the acoustic wave results. Energy is removed from the electron beam and is transferred to the acoustic wave, resulting in amplification of the latter. In order for the amplification to be large, the bunching of electrons in the sound wave must be large. The means chosen here to avoid space charge repulsion, which diminishes the bunching, is to have the sound wave be such as to create two potential waves, 180° out of phase; this occurs for particular sound waves in multi-valley semiconductors.

Figure 4:
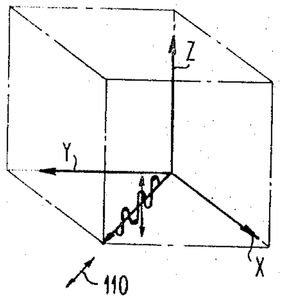
FIGURES 3, 4 and 5 are various showings of the polarization of an sound wave with respect to given axes of a multi-valley semiconductor.
Figure 5:
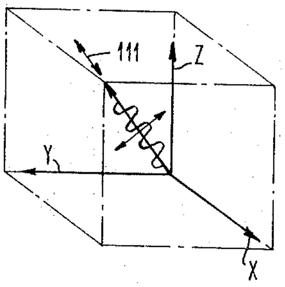
Figure 3:
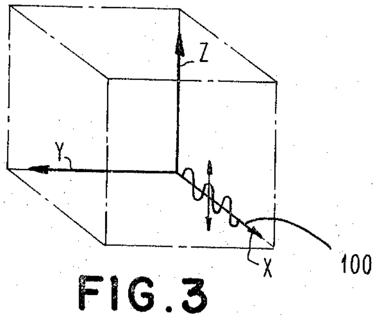

FIGURES 3–5 indicate, for germanium, the axes of acoustic wave propagation and the polarization of the acoustic waves with respect to such axes for which there is electronic bunching without space charge. In FIGURE 3, maximum amplification takes place when the acoustic wave is propagated along the (100) axis of the germanium crystal 2 and the motion of the crystal is transverse to such axis (transverse wave.) FIGURE 4 indicates that maximum amplification in crystal 2 also takes place when the acoustic wave is propagated along axis (110) and such acoustic wave is vibrating longitudinally on axis (110) as indicated by the opposing arrows in FIGURE 4. Amplification also takes place when the acoustic wave is propagated along the (110) axis but vibrates parallel to the (001) axis. Additionally, maximum amplification also results when the acoustic wave is propagated along the (111) axis and the vibrations of such wave are either longitudinal or transverse to said axis.

Hypersonic amplification is also obtained with p-type and n-type silicon crystals by choosing appropriate axes of propagation through such crystals. However, when silicon is used, operating temperatures of the silicon may be higher than those used for germanium, for example, around 40° K. and less.

Although germanium and silicon have been recommended as crystals that can be favorably employed as a component in the above disclosed hypersonic amplifier, many other semiconductors can be substituted for germanium or silicon. Basically, the substitute should be a multi-valley semiconductor having a high deformation potential. This is readily seen by looking at the plot (FIGURE 2) of E v. $k$ of the selected crystal. If the valley $l$ can be readily deformed by a stress wave through the crystal, then such a semiconductor is a good choice. In other words, the higher the deformation potential of the multi-valleyed crystal, the higher will be the amplification of the acoustic wave travelling along selected axes of such crystal.

Figure 6:
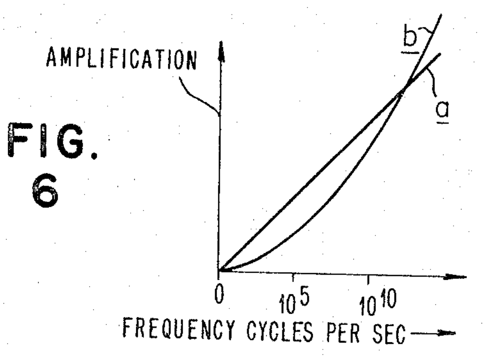
FIGURE 6 is a plot of amplification of the stress wave as a function of its frequency.

The present hypersonic amplifier is particularly effective at frequencies of the order of, or greater than $10^{10}$ cycle per second. FIGURE 6 is a comparision of the frequency dependence of sonic amplifiers using a piezoelectric crystal, and one using germanium. Curve $a$ pertains to a piezoelectric sonic amplifier and is linear. Curve $b$ applies to the present invention and is quadratic. It is noted that starting at a frequency in the neighborhood of $10^{10}$ cycles per second one obtains greater amplification by employing germanium or silicon than by employing a piezoelectric crystal as the amplifying medium.

The invention described above results in a hypersonic amplifier operating on the principle of travelling wave interaction with electrons and capable of considerably amplifying sound waves of the order of $10^{10}$ cycles per second. Such amplification requires no magnetic fields as heretofore were needed for some acoustic amplification that resorted to such travelling wave interaction, and the acoustic losses inherent in most prior acoustic amplifiers are substantially reduced in the present invention.

While the invention has been particularly shown and described with reference to a preferred embodiment thereof, it will be understood by those skilled in the art that various changes in form and details may be made therein without departing from the spirit and scope of the invention.

What is claimed is:

1. A hypersonic amplifier comprising a multi-valley semiconductor crystal having opposed, highly polished, parallel faces, means for directing an acoustical wave along a predetermined axis of said crystal, said acoustical wave having a polarization such that for said axis the acoustical wave lifts the degeneracy of the conduction bands of said multi-valley semiconductor, means external of said crystal for moving free electrons at a velocity greater than the velocity of said acoustical wave in said crystal during the passage of and in the direction of said acoustical wave through said crystal to obtain amplification of said wave within the crystal.

2. A hypersonic amplifier comprising a multi-valley semiconductor crystal of germanium having opposed parallel faces, means for directing an acoustical wave upon o ne face of said crystal along it (111) axis, the acoustical wave vibrating transversely of said (100) axis, and external means for moving free electrons at a velocity greater than the velocity of said acoustical wave in said crystal along said axis, whereby said acoustic wave is amplified as it travels in said crystal.

3. A hypersonic amplifier comprising a multi-valley semiconductor crystal of germanium having opposed parallel faces, means for directing an acoustical wave along the (110) axis, said acoustical wave vibrating longitudinally along, being transverse of said axis, and external means for moving free carriers at a velocity greater than the velocity of said acoustical wave in said crystal along said (110) axis, whereby said acoustic wave is amplified as it travels within said crystal.

4. A hypersonic amplifier comprising a multi-valley semiconductor crystal of germanium having opposed parallel faces, means for directing an acoustical wave upon one face of said crystal along its (111) axis, the vibrations of said acoustical wave being either longitudinal or transverse of said axis, external means for moving free carriers at a velocity greater than the velocity of said acoustical wave in said crystal along said (111) axis during the passage of said acoustical wave through said crystal.

References Cited by the Examiner

Blotekjaer et al., "Proc. IEEE," April 1964, pp. 360–377.

ROY LAKE, *Primary Examiner.*

D. R. HOSTETTER, *Assistant Examiner.*